United States Patent
Yoneyama et al.

(10) Patent No.: US 8,641,338 B2
(45) Date of Patent: Feb. 4, 2014

(54) SPINDLE DEVICE, MACHINING CENTER INCLUDING THE SPINDLE DEVICE, AND METHOD FOR ASSEMBLING THE SPINDLE DEVICE

(75) Inventors: Hiroki Yoneyama, Gunma (JP);
Yoshifumi Inagaki, Gunma (JP);
Osamu Iwasaki, Gunma (JP)

(73) Assignee: NSK Ltd., Tokyo (JP)

( * ) Notice: Subject to any disclaimer, the term of this patent is extended or adjusted under 35 U.S.C. 154(b) by 1234 days.

(21) Appl. No.: 12/520,920

(22) PCT Filed: Oct. 31, 2007

(86) PCT No.: PCT/JP2007/071254
§ 371 (c)(1),
(2), (4) Date: Jun. 23, 2009

(87) PCT Pub. No.: WO2008/078454
PCT Pub. Date: Jul. 3, 2008

(65) Prior Publication Data
US 2010/0028094 A1 Feb. 4, 2010

(30) Foreign Application Priority Data

Dec. 27, 2006 (JP) ................................ 2006-351175
Dec. 27, 2006 (JP) ................................ 2006-351176
Dec. 27, 2006 (JP) ................................ 2006-351177
Dec. 27, 2006 (JP) ................................ 2006-351178

(51) Int. Cl.
*B23C 1/12* (2006.01)
(52) U.S. Cl.
USPC ............ 409/135; 409/201; 409/211; 409/231

(58) Field of Classification Search
USPC ................. 409/134–136, 144, 201, 211, 216, 409/231–233
See application file for complete search history.

(56) References Cited

U.S. PATENT DOCUMENTS 2,434,639 A * 1/1948 Bugatti ......................... 409/231
3,221,605 A * 12/1965 Hemmerle, Jr. .............. 409/239
(Continued)

FOREIGN PATENT DOCUMENTS

CN 2294801 Y 10/1998
DE 102004025970 A1 * 12/2004
(Continued)

OTHER PUBLICATIONS

EPO machine translation of EP 992316, printed Feb. 2013.*
(Continued)

*Primary Examiner* — Daniel Howell
(74) *Attorney, Agent, or Firm* — Sughrue Mion, PLLC

(57) ABSTRACT

A spindle device (20) includes: a bracket (21) swingably mounted on a support arm (9) and having a tubular portion (22) substantially perpendicular to the swing axis of the bracket (21); and, a spindle (30) including a rotation portion (31) capable of mounting a tool onto the leading end thereof, a housing (32) insertably and removably mounted on the tubular portion (22) of the bracket (21) and having a mounting surface (35a) disposed opposed to the surface of the bracket (21), and bearings (50 and 51) respectively interposed between the rotation portion (31) and housing (32) for supporting the rotation portion (31) rotatable relative to the housing (32). In the mounting surface (35a) of the housing (32), there are formed flow passage openings (80~86) for fluid which are supplied to the spindle (30).

9 Claims, 14 Drawing Sheets

(56) References Cited

U.S. PATENT DOCUMENTS

| | | | | |
|---|---|---|---|---|
| 3,698,725 | A | * | 10/1972 | Klabunde ................. 384/121 |
| 5,584,621 | A | * | 12/1996 | Bertsche et al. ............ 409/201 |
| 5,697,739 | A | * | 12/1997 | Lewis et al. ................. 409/230 |
| 5,961,156 | A | * | 10/1999 | Furuhashi ................. 285/154.1 |
| 5,967,716 | A | | 10/1999 | Katsuzawa et al. |
| 6,122,808 | A | * | 9/2000 | Popp ............................... 29/49 |
| 6,332,386 | B1 | * | 12/2001 | Popp ............................. 82/142 |
| 6,554,551 | B1 | * | 4/2003 | Marelli ......................... 409/201 |
| 6,746,188 | B2 | * | 6/2004 | Watanabe ..................... 409/201 |
| 6,932,547 | B2 | * | 8/2005 | Hardesty et al. ............. 409/201 |
| 7,891,920 | B2 | * | 2/2011 | Yoneyama et al. ........... 409/201 |

FOREIGN PATENT DOCUMENTS

| | | | |
|---|---|---|---|
| EP | 504691 | A2 * | 9/1992 |
| EP | 992316 | A1 * | 4/2000 |
| EP | 1405691 | A1 * | 4/2004 |
| JP | 4-193450 | A | 7/1992 |
| JP | 4-283003 | A | 10/1992 |
| JP | 05269604 | A * | 10/1993 |
| JP | 6-31585 | A | 2/1994 |
| JP | 7-266196 | A | 10/1995 |
| JP | 10328905 | A | 12/1998 |
| JP | 11099403 | A * | 4/1999 |
| JP | 11114759 | A | 4/1999 |
| JP | 11-179631 | A | 7/1999 |
| JP | 2001-65760 | A | 3/2001 |
| JP | 2001-287102 | A | 10/2001 |
| JP | 2003001541 | A | 1/2003 |
| JP | 2003011029 | A | 1/2003 |
| JP | 2003-80402 | A | 3/2003 |
| JP | 2003207094 | A | 7/2003 |
| JP | 2006088245 | A | 4/2006 |
| JP | 2006-289595 | A | 10/2006 |
| WO | 96/41695 | A1 | 12/1996 |

OTHER PUBLICATIONS

Japanese Office Action issued in corresponding Japanese Application No. 2006-35117 on Aug. 16, 2011.

Japanese Office Action dated Oct. 12, 2011 issued by the Japanese Patent Office in corresponding Japanese Application No. 2006-351178.

Communication dated Dec. 12, 2011, issued by the Japanese Patent Office in corresponding Japanese Patent Application No. 2006-351177.

Chinese Office Action dated Apr. 13, 2010, in counterpart Chinese Application No. 200780048271.2.

Japanese Office Action dated Apr. 3, 2012 issued by the Japanese Patent Office in counterpart Japanese Application No. 2006-351175.

* cited by examiner

SPINDLE DEVICE, MACHINING CENTER INCLUDING THE SPINDLE DEVICE, AND METHOD FOR ASSEMBLING THE SPINDLE DEVICE

TECHNICAL FIELD

The present invention relates to a spindle device, a machining center including the spindle device, and a method for assembling the spindle device. More specifically, the invention relates to a spindle device to be mounted onto the spindle head of a portal machining center, a machining center including the spindle device, and a method for assembling the spindle device.

BACKGROUND ART

Conventionally, as a machining center which moves a large-size work and a tool relative to each other in a three-dimensional manner to thereby carry out working operations such as a cutting operation and a drilling operation, for example, there is used a portal machining center which not only moves straight a table with a work mounted thereon in a reciprocating manner but also controls a spindle including a tool in the X axis, Y axis and Z axis directions.

In the portal machining center, a saddle is mounted on a cross rail supported by two columns, a spindle head is mounted on an end portion of a ram movable in the Z axis direction relative to the saddle, and further a motor built-in type spindle is swingably mounted on the two support arms of the spindle head through a bracket (see, for example, the patent reference 1).

Also, in a spindle device included in an ordinary machine tool, a rotation joint for supplying liquid such as coolant to a tool is disposed within a spindle, and the fluid is supplied through a piping to the rotation joint from a liquid supply apparatus provided externally of the spindle device (see, for example, the patent reference 2).

Patent Reference 1: International Patent Publication No. WO96/41695 (FIG. 4)
Patent Reference 2: Japanese Patent Unexamined Publication JP-A-2001-287102 (FIG. 4)

DISCLOSURE OF THE INVENTION

Problems that the Invention is to Solve

Here, in the spindle used in the machining center disclosed in the patent reference 1, there are used fluid such as a cutting fluid, a lubricant, a coolant, compressed air and hydraulic operating oil, thereby requiring flow passages which are respectively used to supply or discharge these fluid. Conventionally, these flow passages are respectively structured so as to be respectively connected to the spindle by pipings. Therefore, in the maintenance of the spindle, when disassembling the spindle from the bracket or assembling the spindle to the bracket, many pipings must be disassembled and then assembled, which results in the long time for the maintenance of the spindle. Since, during the maintenance, the machine must be stopped and the down time increases, resulting in the lowered productivity.

Also, in the machining center of the patent reference 1, the spindle, onto which a tool is to be mounted, is directly fastened and fixed to the bracket by bolts so as to swing together with the bracket. For example, when replacing the spindle in order to carry out the maintenance of the respective composing parts of the spindle, if there are generated errors in the dimensions of the composing parts of the spindle, there is generated a difference in the swing radius of the tool between before and after the replacement of the spindles, thereby raising a possibility that the working precision of the tool may be lowered. Also, in order to strictly manage the swing radius of the tool, it is necessary to strictly manage the dimension tolerances of the respective composing parts of the spindle onto which the tool is to be mounted as well, which results in the increased manufacturing cost of the product.

Further, in the machine tool according to the patent reference 1, there is found no disclosure of wirings such as power lines and signal lines for driving the motor of the spindle. The spindle of the machine tool is used under such an environment as is normally exposed to the coolant and, therefore, in order that these wirings can be arranged from the spindle to the spindle head side, the waterproof properties of these wirings must be taken into consideration.

Also, when the spindle device of the patent reference 2 is applied to the above-mentioned machining center, it is necessary to provide within the bracket a space for arranging pipes which are used to supply the fluid to the rotation joint; however, this results in the increased size of the spindle device. In this case as well, in the maintenance of the spindle, when decomposing the spindle from the bracket or when assembling the former to the latter, the piping must be decomposed or assembled, resulting in the increased time for the maintenance. Since, during the maintenance, the machine must be stopped, the down time is increased and thus the productivity of the present spindle device is lowered.

The present invention is developed aiming to solve the above problems. Specifically, a first object of the invention is to provide a spindle device and a machining center which can replace this spindle in a very short time, can reduce the down time for the maintenance and can provide high productivity. A second object of the invention is to provide: a spindle device which need not manage and adjust strictly the dimension tolerances of the respective composing parts of a spindle, can be manufactured at a low cost and can provide high working precision; a machining center including such spindle device; and, a method for assembling such spindle device. A third object of the invention is to provide a spindle device and a machining center which can arrange a rotation joint with a compact structure, can provide a short down time for the maintenance and can provide high productivity. A fourth object of the invention is to provide a spindle device and a machining center which can secure the waterproof property of wirings.

Means for Solving the Problems

The above objects of the invention can be attained by the following structures.
(1) A spindle device including:
  a bracket swingably mounted on a support arm and including a tubular portion substantially perpendicular to a swing axis of the bracket; and
  a spindle including:
    a rotation portion capable of mounting a tool on a leading end portion thereof;
    a housing mounted on the tubular portion of the bracket so as to be adapted to be inserted into and removed from the tubular portion of the bracket, the housing having a mounting surface opposing to a surface of the bracket; and
    a bearing interposed between the rotation portion and the housing, and supporting the rotation portion rotatable relative to the housing, wherein a flow passage opening for fluid to be supplied to the spindle is provided on the mounting surface of the housing.

(2) A spindle device including:
- a bracket swingably mounted on a support arm and including a tubular portion substantially perpendicular to a swing axis of the bracket;
- a spindle including:
  - a rotation portion capable of mounting a tool on a leading end portion thereof;
  - a housing mounted on the tubular portion of the bracket so as to be insertable into and removable from the tubular portion of the bracket; and
  - a bearing interposed between the rotation portion and the housing, and rotatably supporting the rotation portion relative to the housing; and
- a spacer capable of absorbing an error of a swing radius of the tool.

(3) The spindle device as set forth in aspect (2), wherein the spacer is interposed between the leading end face of the bracket and a mounting surface of a flange portion which is provided on the housing so as to oppose to the leading end face of the bracket.

(4) A spindle device including:
- a bracket swingably mounted on a support arm and including a tubular portion substantially perpendicular to a swing axis of the bracket; and
- a spindle including:
  - a rotation portion capable of mounting a tool on a leading end portion thereof;
  - a housing mounted on the tubular portion of the bracket so as to be insertable into and removable from the tubular portion of the bracket;
  - a bearing interposed between the rotation portion and the housing, and rotatably supporting the rotation portion relative to the housing; and
  - a rotation joint mounted on a rear portion of the housing, and supplying fluid to the rotation portion of the spindle,
- wherein the rotation joint includes a flange portion,
- the flange portion opposes to a rear portion end face of the housing and
- a flow passage opening for fluid to be supplied to the rotation joint is provided on the flange portion.

(5) A spindle device including:
- a bracket swingably mounted on a support arm and including a tubular portion substantially perpendicular to a swing axis of the bracket; and,
- a spindle mounted on the tubular portion of the bracket so as to be insertable into and removable from the tubular portion of the bracket,
- wherein a tool is adapted to be mounted onto one end side of the spindle, and a wiring is provided on and extended from the other end side of the spindle, and
- the bracket includes:
  - a bracket main body having the tubular portion; and,
  - a tubular cover member mounted on a rear end face of the bracket main body and on an outer peripheral surface of the spindle, the cover member accommodating therein the extended wiring.

(6) The spindle device as set forth in aspect (5), wherein seal members are respectively provided between the rear end face of the bracket main body and a front end face of the cover member; and between the outer peripheral surface of the spindle and an inner peripheral surface of the cover member.

(7) A machining center including a spindle device as set forth in any one of aspects (1) through (6).

(8) A method for assembling a spindle device which includes:
- a bracket swingably mounted on a support arm and including a tubular portion substantially perpendicular to a swing axis of the bracket; and
- a spindle including:
  - a rotation portion capable of mounting a tool on a leading end portion thereof;
  - a housing mounted on the tubular portion of the bracket so as to be insertable into and removable from the tubular portion of the bracket; and
  - a bearing interposed between the rotation portion and the housing and rotatably supporting the rotation portion relative to the housing,
- the spindle device assembling method including the steps of:
- measuring a swing radius of the tool;
- providing a spacer capable of absorbing a difference between the thus measured swing radius and a desired swing radius; and
- fixing the housing of the spindle to the bracket through the spacer.

Effects of the Invention

According to the invention, a housing to be removably mounted on the tubular portion of a bracket is structured such that, flow passage openings for fluid to be supplied to the spindle are formed on the mounting surface of the housing which opposes to the surface of the bracket. Accordingly, when the spindle is removed from the bracket, simultaneously the flow passages for the fluid are separated, whereby the spindle can be removed from the bracket in a short time without decomposing a piping. Also, since the fluid flow passages are connected simultaneously when the spindle is assembled to the bracket, similarly to the decomposing operation, the pipes need not be assembled but the spindle can be assembled to the bracket in a short time. Further, if flow passages are used as the discharge passages for the fluid, since no opening is formed on the spindle side except for the mounting surface, invasion of foreign matter can be prevented positively.

According to the invention, since the housing of the spindle is fixed to the bracket through the spacer, an error in the swing radius of a tool can be absorbed by the spacer. This eliminates the need to manage and adjust strictly the dimension tolerances of the respective composing parts of the spindle. Owing to this, the spindle device can be manufactured at a low cost and the working precision of the spindle device can also be enhanced.

According to the invention, since the rotation joint for supplying the fluid to the rotation portion includes a flange portion which opposes to the rear portion end face of the housing and onto which the flow passage opening for the fluid to be supplied to the rotation joint is formed, the fluid can be supplied to the rotation joint with no piping, eliminating the need to provide a space for the piping in the bracket, whereby the spindle device can be manufactured with a compact structure. Also, since the flow passages for the fluid to be supplied to the rotation joint are connected simultaneously when the rotation joint is assembled to the housing, there is eliminated the need to decompose and assemble the piping when the spindle is removed from or assembled to the bracket, whereby the down time necessary for the maintenance of the spindle device can be reduced and the productivity thereof can also be enhanced.

According to the invention, since the wiring extended from the other end side of the spindle is accommodated into the tubular cover member mounted on the rear end face of the bracket main body and also on the rear end portion outer peripheral surface of the spindle, the wiring can be arranged on the support arm side without being exposed to the outside, thereby being able to secure the waterproof property of the wiring. Also, because the cover member is mounted on the rear end portion outer peripheral surface of the spindle, the cover member is provided without stretching the whole of the spindle device in the axial direction, whereby the spindle device can be produced with a compact structure.

Also, since, between the rear end face of the bracket main body and the front end face of the cover member as well as between the rear end portion outer peripheral surface of the spindle and the inner peripheral surface of the cover member, there are interposed seal members respectively, the waterproof property of the wiring can be enhanced further.

DESCRIPTION OF REFERENCE NUMERALS

Figure 1:
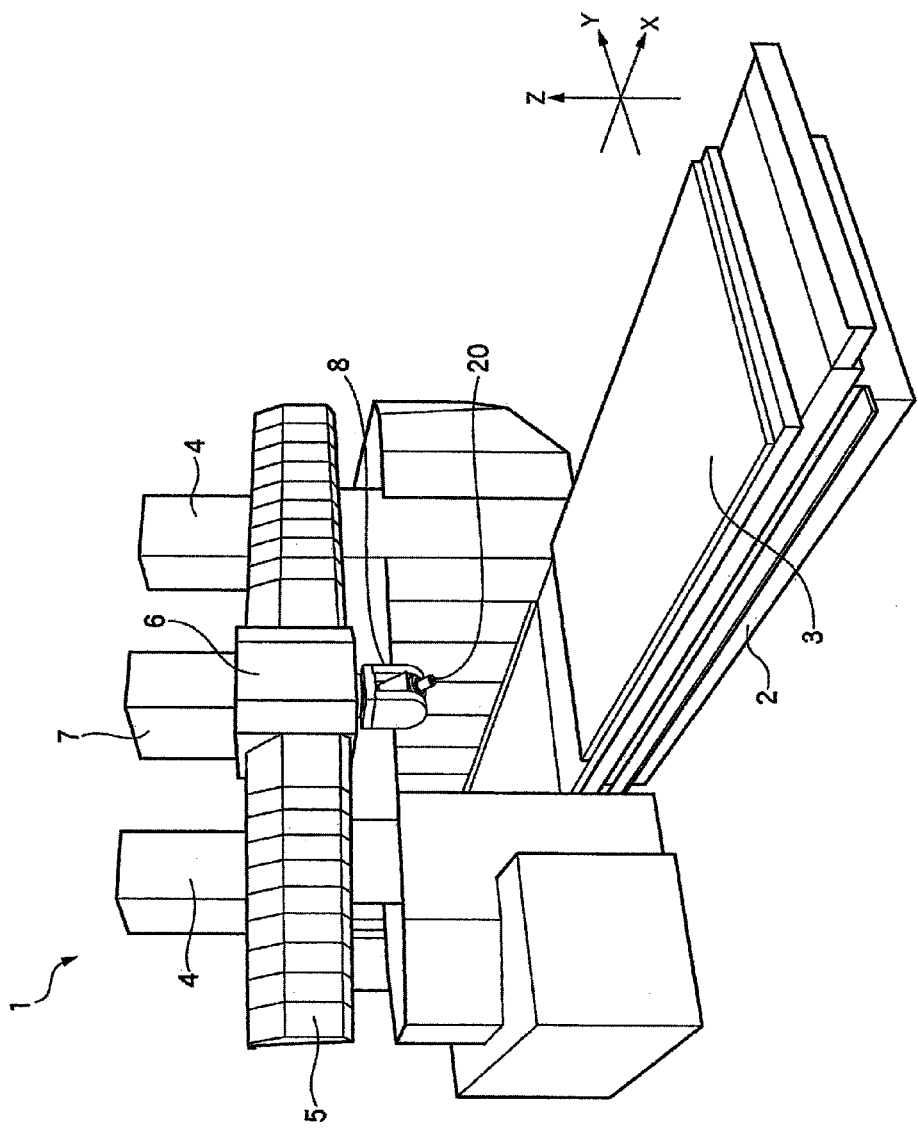
FIG. 1 is a schematic view of a portal machining center to which a spindle device according to a first embodiment of the invention is applied.

1: Portal machining center (machining center)
20: Spindle device
21: Bracket
22: Tubular portion
23: Bracket main body
23c: Leading end face
24: Flat plate cover
25: Rear cover
27: Spacer
30: Spindle
31: Rotation portion
32: Housing
35: Intermediate housing
35b: Mounting surface
39: Outer tube
40: Front side housing
50: Front side bearing
51: Rear side bearing
70: Rotation joint
71: Joint case
71a: Flange portion
71b: Flow passage opening
72: Bearing
73: Rotation pipe shaft
75: Floating sheet
76: Seal portion
80: Entrance side flow passage opening for coolant for bearing and motor
81: Flow passage opening for pressure oil for clamping of piston
82: Flow passage opening for flood coolant
83: Flow passage for taper air blow
84: Flow passage for air seal air
85: Flow passage opening for pressure oil for unclamping of piston
86: Exit side flow passage opening for cooling oil for bearing and motor
97: Power line (wiring)
98: Signal line (wiring)
110, 111: O-ring
120: Cover member

BEST MODE FOR CARRYING OUT THE INVENTION

First Embodiment

Now, description will be given below in detail of a spindle device and a portal machining center serving as a machining center respectively according to a first embodiment of the invention with reference to the accompanying drawings.

As shown in FIG. 1, in a portal machining center 1, a table 3 is supported on a bed 2 so as to be movable in the X axis direction and, on both sides of the bed 2, there are erected a pair of columns 4. On the upper ends of the columns 4, there is provided a cross rail 5 and, on the cross rail 5, there is disposed a saddle 6 so as to be movable in the Y axis direction. Also, on the saddle 6, there is supported a ram 7 which can be moved up and down in the Z axis direction. On the lower end of the ram 7, there is mounted a spindle head 8 for holding a spindle device 20 according to the invention so that the spindle head 8 can drive the spindle device 20, that is, it can rotate and index the spindle device 20 around the Y axis and also around the Z axis.

Figure 2:
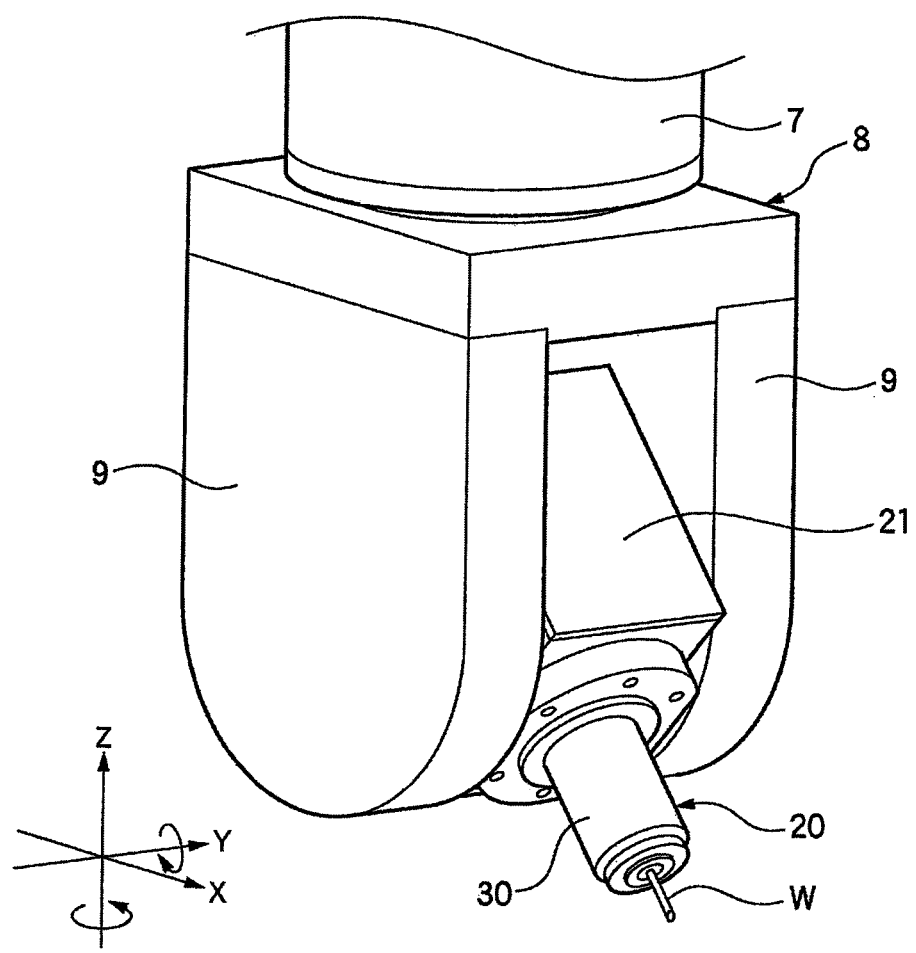
FIG. 2 is a perspective view of the main portions of a spindle head shown in FIG. 1.
Figure 3:
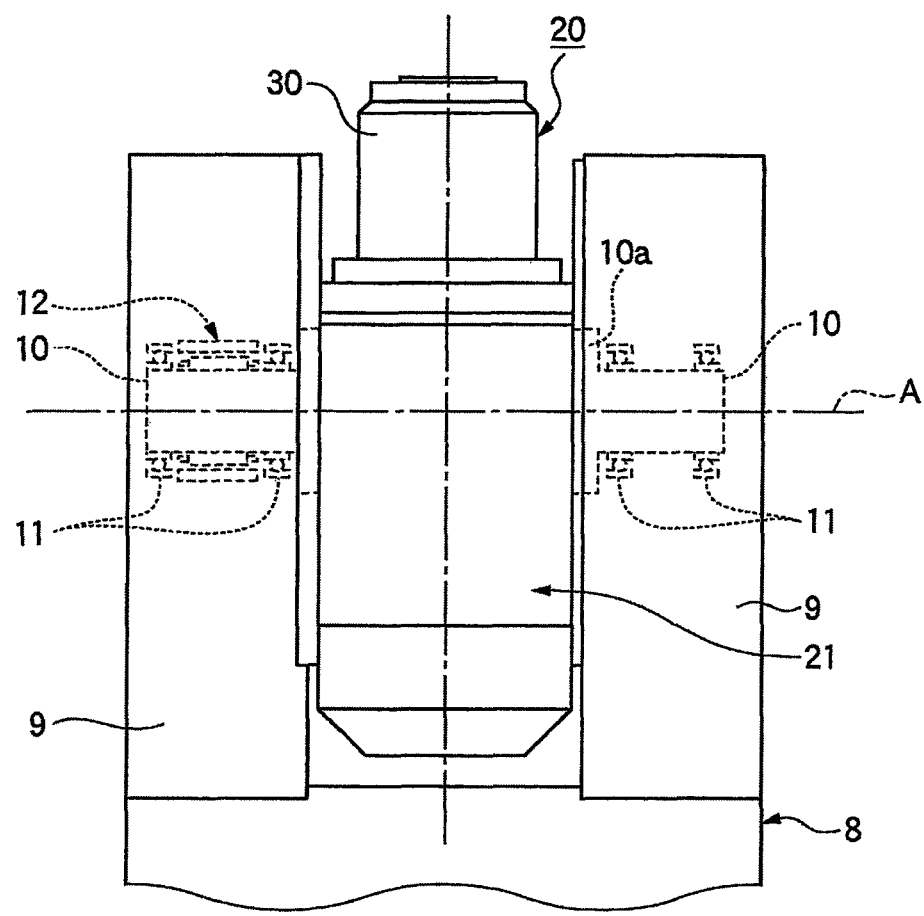
FIG. 3 is a front view of the spindle head.

As shown in FIGS. 2 and 3, the spindle head 8 includes a pair of support arms 9 disposed so as to hold the bracket 21 of the spindle device 20 between them. In an interior of the support arms 9, there are accommodated a pair of swing shafts 10 which are fixed to the two side surfaces of the bracket 21 respectively so as to be rotatable through multiple bearings 11. Also, a motor 12 is arranged in one swing shaft 10, whereby the spindle device 20 can be mounted onto the pair of support arms 9 so as to be swung around the Y axis (swing axis A). Here, the swinging motion of the spindle device 20 may not be driven by the arrangement of the motor 12 around the swing shaft 10 but may also be driven by using a gear.

Figure 4:
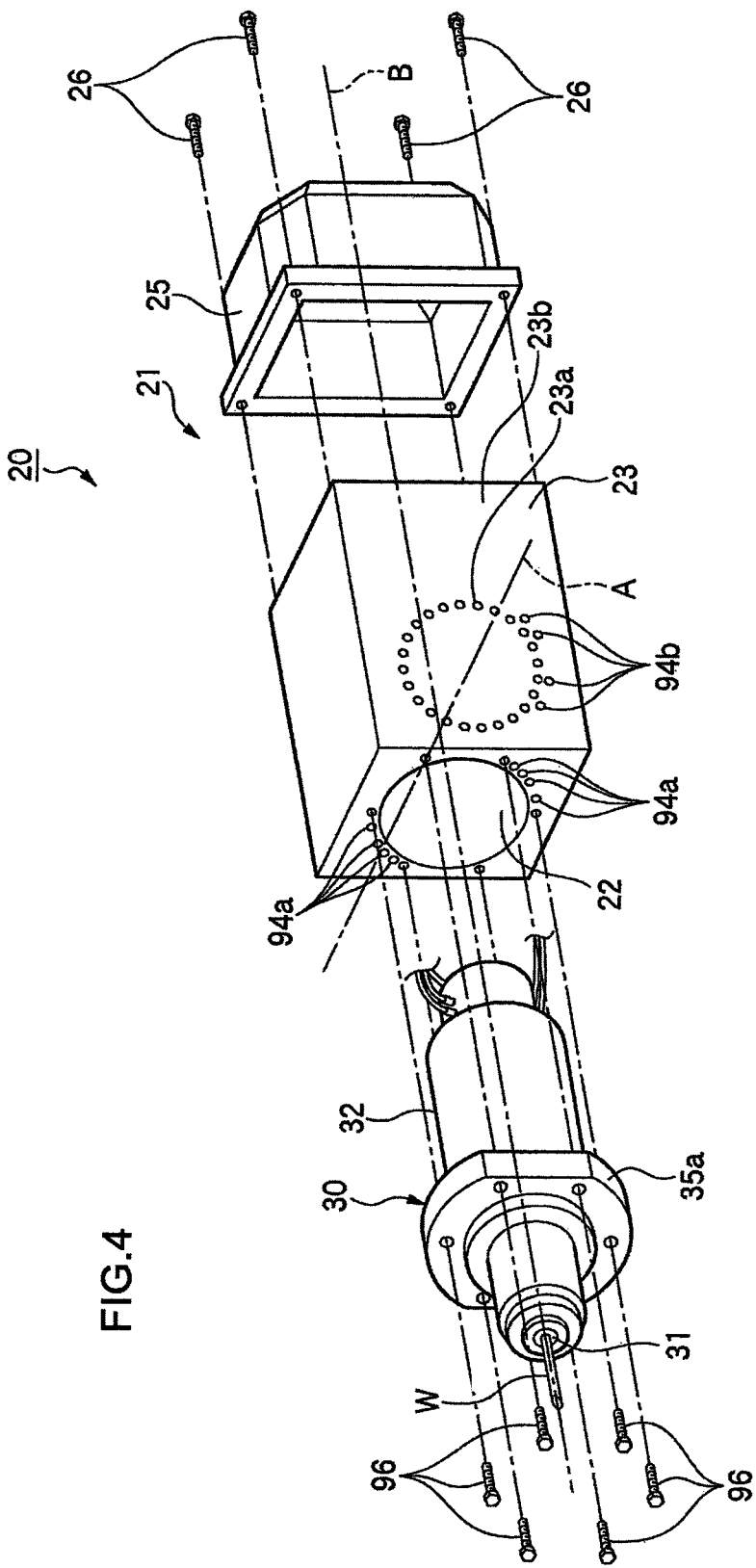
FIG. 4 is an exploded perspective view of the spindle device.
Figure 5:
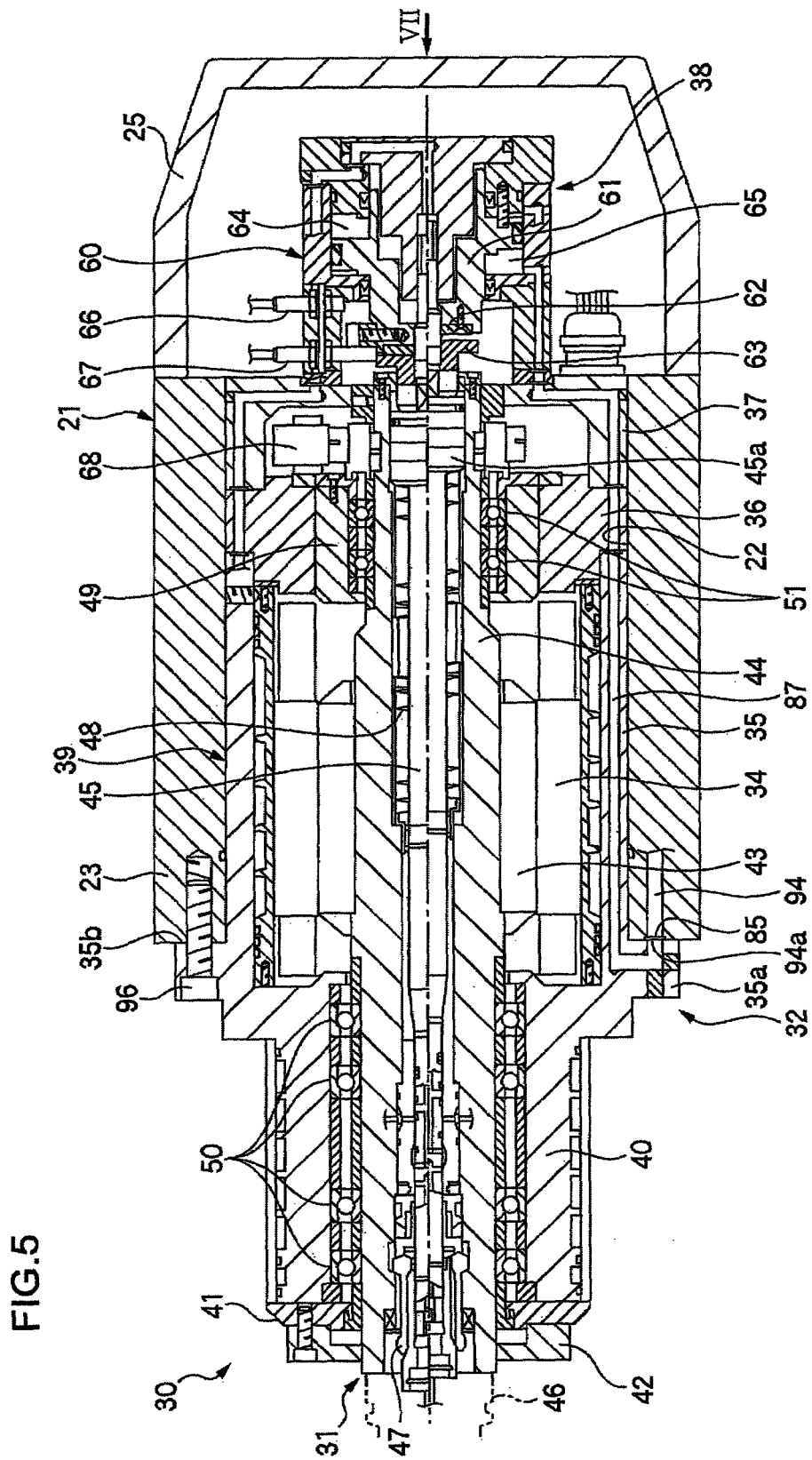
FIG. 5 is a section view of the spindle device.

As shown in FIGS. 4 and 5, the bracket 21 of the spindle device 20 includes: a bracket main body 23 having the swing shafts 10 respectively fixed to the two side surfaces thereof in the Y axis direction, and including a tubular portion 22 penetrating therethrough in the X axis direction (which is a direction substantially perpendicular to the swing axis); and, a rear cover 25 which can be fixed to the rear end face of the bracket main body 23 by bolts 26. Onto the tubular portion 22 of the bracket main body 23, there is mounted the housing 32 of the spindle 30 so as to be insertable thereinto and removable therefrom. Here, in FIG. 4, reference character 23a designates bolt holes into which the swing shafts 10 can be mounted.

As shown in FIG. 5, the spindle 30 of a motor-built-in type includes a rotation portion 31 onto the leading end of which a tool W can be mounted, a housing 32 which can be mounted on the tubular portion 22 of the bracket main body 23 so as to be insertable thereinto and removable therefrom, and front side and rear side bearings 50, 51 which are respectively interposed between the rotation portion 31 and housing 32 for supporting the rotation portion 31 such that the rotation portion 31 can be rotated with respect to the housing 32.

The housing 32 includes: an outer tube 39 which contains an intermediate housing 35 for mounting a stator 34 thereon, a sleeve housing 36, a rear side housing 37, and a rear cover 38; a front side housing 40 formed integrally with the outer tube 39; and, a front top 41 and a front cover 42 respectively mounted in front of the front side housing 40. Here, the intermediate housing 35 and sleeve housing 36 may also be formed integrally with each other. Also, the outer tube 39 and front side housing 40 may also be formed separately from each other.

In the rotation portion 31, there are provided: a rotatable rotation shaft 44 including a rotor 43; a draw bar 45 which is mounted within the rotation shaft 44 such that it can be moved with respect to the rotation shaft 44 in the axial direction; and, a spring 48 which is mounted on the outside of the draw bar 45 such that the draw bar 45 can draw a collet portion 47 for fixing a tool holder 46 inwardly in the axial direction, and also which is interposed between the rotation shaft 44 and the large-diameter portion of the draw bar 45 in the axial direction so as to be compressed. Here, as the spring 48, there is used a disc spring; however, there may also be used a coil spring, a spiral disc spring or the like.

Each of the front side bearings 50 is formed of a combined angular ball bearing in which an outer race is fixed to the front side housing 40 and an inner race is fitted with the outer surface of the one end side of the rotation shaft 44. Also, with the sleeve housing 36 disposed on the other end side of the rotation shaft 44, there is fitted a bearing sleeve 49 which can be moved in the axial direction of the rotation shaft 44. And, each of the rear side bearings 51 is formed of a pair of angular ball bearings in which an outer race is fixed to the bearing sleeve 49 and an inner race is fitted with the outer surface of the other end side of the rotation shaft 44; and, the rear side bearings 51 cooperate together with the front side bearings 50 to support the rotation shaft 44 so as to be rotatable.

On the rear end side of the draw bar 45, there is provided a piston contact portion 63 which can be pressed by a piston pressing portion 62 mounted on the piston 61 of a piston mechanism 60 for replacement of a tool. Referring to the operation of the piston mechanism 60, when a pressure medium such as oil, water or air is introduced into the advancing side pressure introduction portion 64 thereof, the piston 61 is moved in an advancing direction, the piston pressing portion 62 of the piston 61 is pressed against the piston contact portion 63 to press and move the draw bar 45 in the axial direction. Thus the draw bar 45 pushes out the tool W, thereby turning the tool into the unclamped position thereof (see the position of the upper portion of FIG. 5). On the other hand, when the pressure of the advancing side pressure introduction portion 64 is released and thus the pressure medium is introduced into the returning side pressure introduction portion 65 of the piston mechanism 60, the piston 61 is moved or returned to return the draw bar 45 in the axial direction, thereby turning the tool into the clamped position thereof (see the position of the lower portion of FIG. 5).

To the rear cover 38, there are fixed a position detect sensor 66 for detecting the position of the piston 61 of the piston mechanism 60 and a tool detect sensor 67 for checking whether the tool W is present or not. In the interior of the rear side housing 37, there is disposed an encoder 68 for detecting the rotation speed of the rotation shaft 44.

The outer tube 39 is fixed to the bracket 21 so that the flange portion 35a of the intermediate housing 35 is fastened to the leading end face of a bracket main body 23 by bolts. Therefore, the outer tube 39 is structured such that, when bolts 96 are removed, the spindle 30 can be pulled out from the bracket 21 toward the leading end side thereof.

Figure 7:
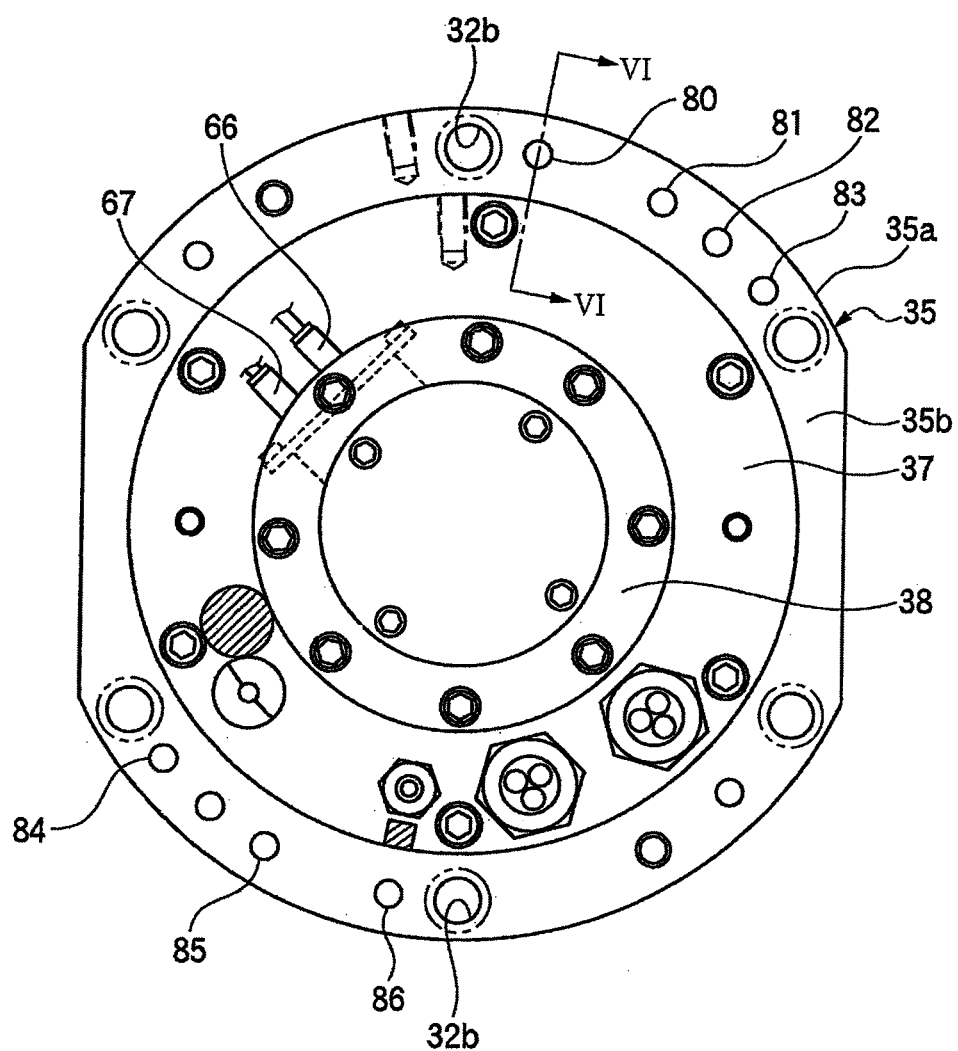
FIG. 7 is a back view of a spindle removed from a bracket, when it is viewed from the arrow mark VII direction shown in FIG. 5.

Also, flow passage openings opposing to the leading end face of the bracket main body 23 are formed on the mounting surface 35b of the intermediate housing 35. All fluid supplied to the spindle 30 are supplied or discharged from the flow passage openings formed in the mounting surface 35b. As shown in FIG. 7, in the mounting surface 35b of the flange portion 35, there are formed an entrance side flow passage opening 80 for cooling oil for cooling the bearing and motor, a flow passage opening 81 for pressure oil for clamping the piston 61, a flow passage opening 82 for flood coolant, a flow passage opening 83 for taper air blow, a flow passage opening 84 for air seal air, a flow passage opening 85 for pressure oil for unclamping the piston 61, and an exit side flow passage opening 86 for cooling oil for cooling the bearing and motor, respectively. Here, reference character 32b shown in FIG. 7 designates bolt holes (in the present embodiment, six bolt holes) which are respectively formed in the flange portion 35a of the intermediate housing 35 and into which the bolts 96 can be inserted.

Figure 6:
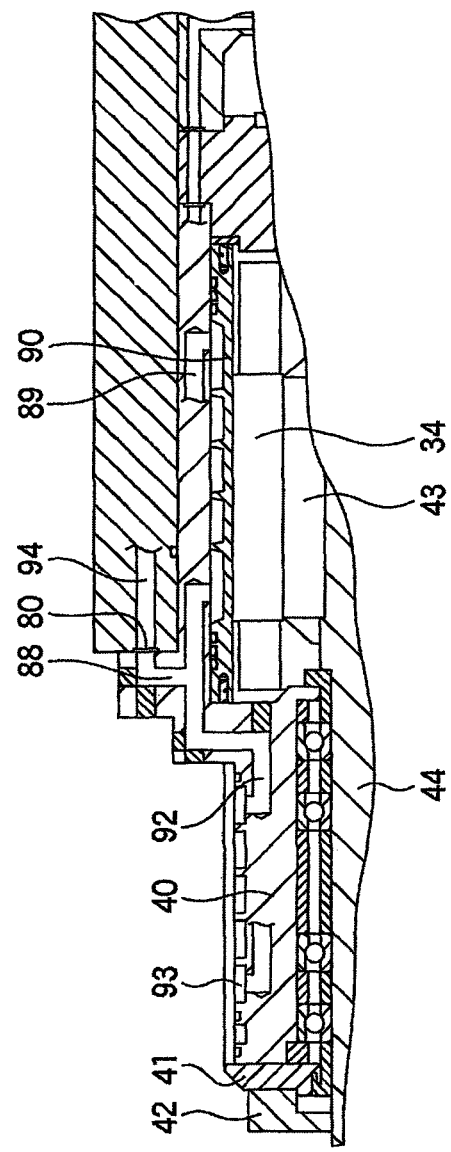
FIG. 6 is a partially sectional view of the spindle device, taken along the VI-VI line shown in FIG. 7.

For example, as shown in FIG. 5, the unclamping pressure oil is introduced from a flow passage 94 formed on the bracket side to a flow passage opening 85 formed in the mounting surface 35b of the intermediate housing 35, is further guided through flow passages 87 respectively formed in the intermediate housing 35, sleeve housing 36 and rear side housing 37, and is then supplied to a return side introduction portion 65. Also, as shown in FIG. 6, the cooling oil for the bearing and motor is also introduced from the bracket side flow passage 94 to the flow passage opening 80 formed in the mounting surface 35b of the intermediate housing 35. After then, a flow passage 88, which extends from the flow passage opening 80, diverges within the intermediate housing 35. Portion of the cooling oil is supplied to a cooling tube 90 through a flow passage 89 which extends backwardly of the intermediate housing 35; and, the remaining portions of the cooling oil are supplied to a cooling portion 93 through a flow passage 92 formed in the front side housing 40. Here, other fluid are also supplied from the intermediate housing 35 to their desired positions through their corresponding flow passages respectively formed in the respective housings, or, they are discharged from the intermediate housing 35 to the bracket side through their corresponding flow passages respectively formed in the respective housings.

On the other hand, a flow passage 94 on the bracket side for the respective fluid is formed in the bracket main body 23 and allows mutual communication between the openings 94a respectively formed in the leading end face of the bracket main body 23 and openings 94b respectively formed in a mounting surface 23b opposing to the flange 10a (see FIG. 3) of the swing shaft 10. The flow passage 94, which is opened in the mounting surface 23b of the bracket main body 23, communicates with a flow passage (not shown) formed in the flange 10a of the swing shaft 10 with no piping. Accordingly, the flow passages of the fluid to be supplied to the spindle 30 are allowed to communicate with each other from the swing shaft side up to the desired position of the spindle 30 through the bracket main body 23 and intermediate housing 35. Further, the fluid flow passages between the respective composing parts can be separated from each other simultaneously when the swing shaft 10 and bracket main body 23 are decomposed, or when the bracket main body 23 and intermediate housing 35 are decomposed. Also, the fluid flow passages between the respective composing parts can be assembled simultaneously when the swing shaft 10 and bracket main body 23 are put together, or when the bracket main body 23 and intermediate housing 35 are put together. Here, in the peripheries of the respective flow passage openings between the opposed surfaces of these parts, there are disposed O-rings respectively, thereby preventing the fluid from leaking from the flow passage openings formed in the opposed surfaces.

Therefore, according to the spindle device 20 of the present embodiment, since the intermediate housing 35, onto which the tubular portion 22 of the bracket main body 23 is mounted so as to be insertable into and removable from the tubular portion 22, is structured such that the flow passage openings 80 though 86 for the fluid to be supplied to the spindle 30 are respectively formed in the mounting surface 35b disposed opposed to the leading end face of the bracket main body 23, simultaneously when the spindle 30 is removed from the bracket 21, the flow passages for the fluid can be separated. Accordingly, the spindle 30 can be removed from the bracket 21 in a short time without decomposing the piping. Also, because the flow passages for the fluid can be connected simultaneously when the spindle 30 is assembled to the bracket 21, similarly to the decomposing operation, there is no need to assemble pipes but the spindle 30 can be assembled to the bracket 21 in a short time. Further, if the flow passages are used as the discharge passages for the fluid, since no opening is formed on the spindle side except for the mounting surface 35b, it is possible to positively prevent foreign matter or the like against invasion.

Second Embodiment

Next, description will be given below in detail of a spindle device and a portal machining center serving as a machining center according to a second embodiment of the invention with reference to FIGS. 8 and 9. Here, the parts thereof equivalent to those of the first embodiment are given the same designations and thus the description thereof is omitted or simplified here.

Figure 8:
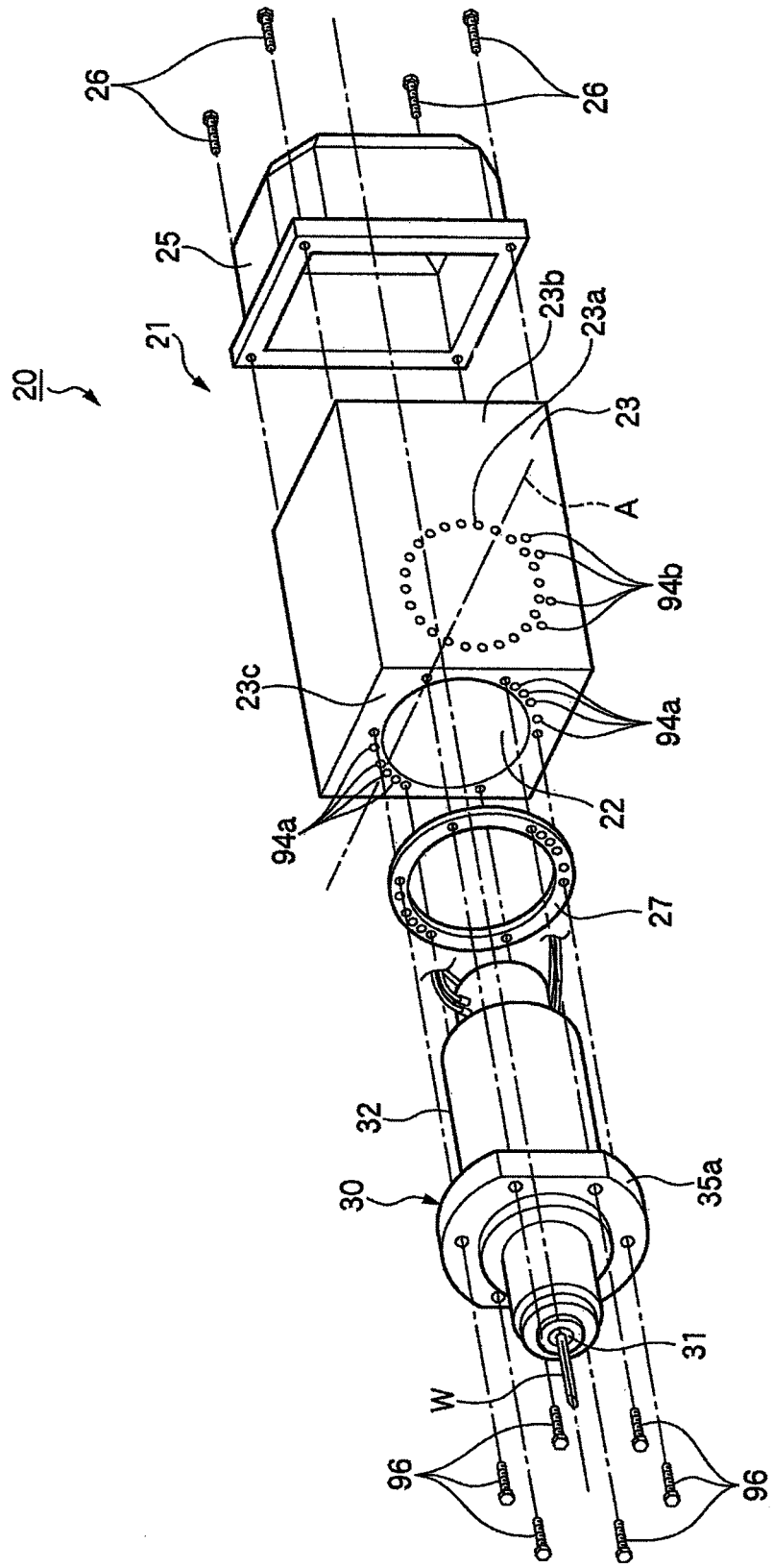
FIG. 8 is an exploded perspective view of a spindle device according to a second embodiment of the invention.
Figure 9:
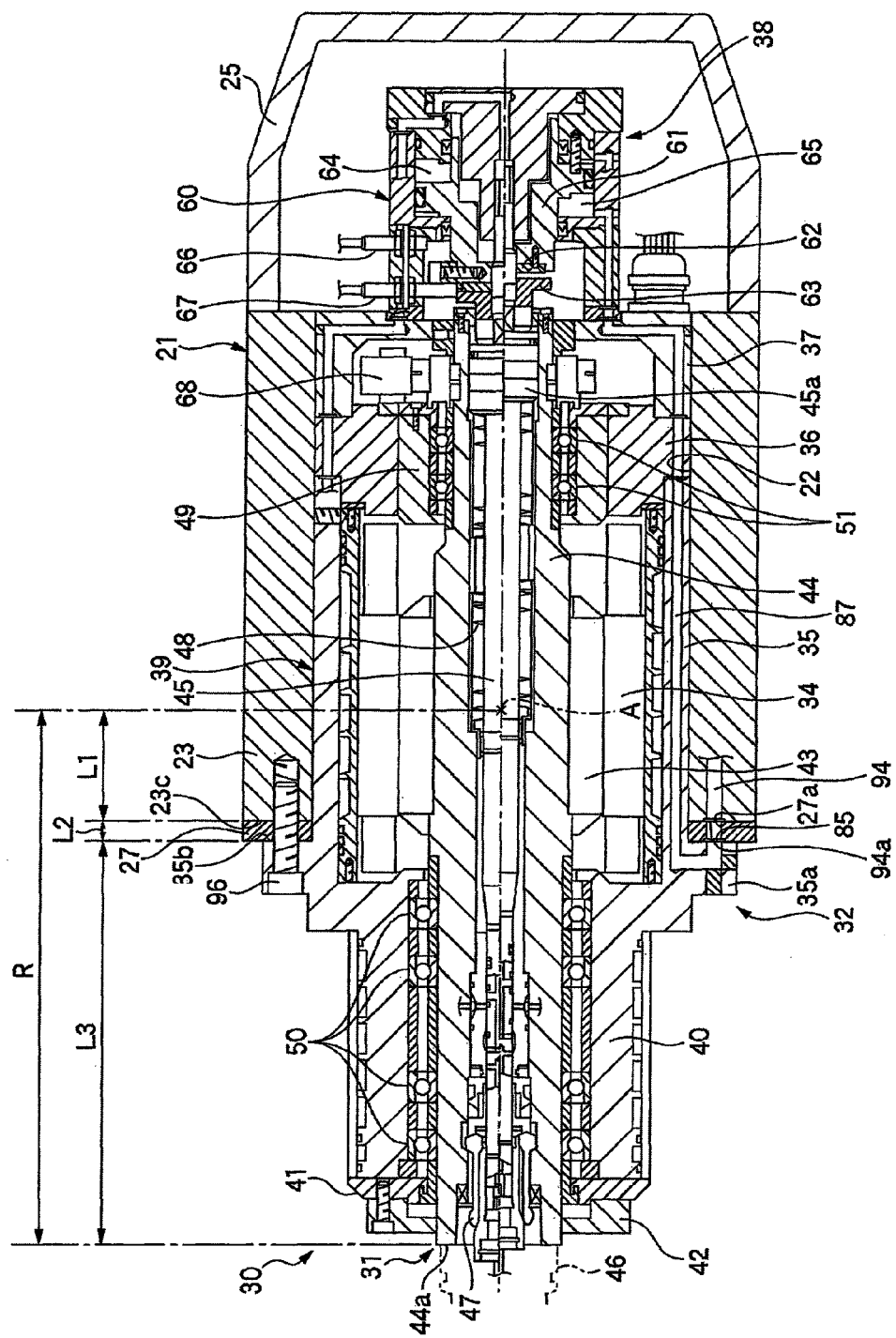
FIG. 9 is a section view of the spindle device shown in FIG. 8.

As shown in FIGS. 8 and 9, according to the present embodiment, the outer tube 39 is fixed to the bracket 21 so that the flange portion 35a of the intermediate housing 35 is fastened through a spacer 27 by using a bolt to the leading end face 23c of the bracket main body 23. Therefore, by removing bolts 96, the spindle 30 can be pulled out toward the leading end side from the bracket 21.

The spacer 27 is formed in a ring shape and is interposed between the leading end face 23c of the bracket main body 23 and the mounting surface 35b of the flange portion 35a which opposes to the leading end face 23c in order to absorb an error of the swing radius of the tool W. The spacer 27 may also be fixed to the mounting surface 35b of the flange portion 35a by adhesion or by bolts in advance, or it may also be fastened together when the flange portion 35a of the intermediate housing 35 is fastened to the bracket main body 23.

Since the axial distance L1 from a swing axis A to the leading end face 23c of the bracket main body 23 is uniform, when the sum of the axial dimension L2 of the spacer 27 and the axial dimension L3 of the spindle side is set to be uniform, the swing dimension of the tool W can be set to be a desired swing dimension.

The axial dimension L3 between the leading end face 44a of the rotation shaft 44 and the mounting surface 35b of the flange portion 35a is measured by using a measuring device such as dial gauge, and then, based on the axial dimension L3, the axial dimension L2 of the spacer 27 is properly determined. Here, the leading end face 44a functions as a reference surface on which a tool holder 46 for mounting the tool W is mounted.

The spacer 27 may also be worked such that it has a desired axial dimension L1, or, there may be prepared multiple spacers 27 differing in the axial dimension and a spacer having a desired axial dimension L1 may be assembled to the spacer 27. Here, the swing dimension of the tool W can be decided by setting an axial dimension R between the swing axis A and the leading end face 44a of the rotation shaft 44.

Therefore, for example, when replacing the spindle 30 with respect to the bracket 21, even if the axial dimension L3 on the spindle side varies, by providing a spacer 27 having a desired axial dimension L2, an error between the variation of the dimension L3 and the desired swing radius can be absorbed by the spacer 27. Accordingly, even when the spindle 30 is replaced, the swing radius of the tool is prevented from varying, and thus, the excellent working precision of the tool can be kept.

Also, similarly to the first embodiment, in the mounting surface 35b of the flange portion 35a of the intermediate housing 35 opposing to the leading end face 23c of the bracket main body 23, flow passage openings are formed. All fluid to be supplied to the spindle 30 are supplied or discharged from these flow passage openings formed in the mounting surface 35b. Thus, the unclamping pressure oil is introduced from the flow passage 94 on the bracket side through a penetration passage 27a formed in the spacer 27 to a flow passage opening 85 formed in the mounting surface 35b of the intermediate housing 35, can be further guided through flow passages 87 respectively formed in the intermediate housing 35, sleeve housing 36, rear side housing 37 and rear cover 38, and is finally supplied to a return side pressure introduction portion 65.

Therefore, according to the spindle device 20 of the present embodiment, since the housing 32 of the spindle 30 is fixed to the bracket 21 through the spacer 27, the error of the swing radius R of the tool W can be absorbed by the spacer 27, the dimensional tolerances of the respective composing parts of the spindle 30 need not be managed or adjusted strictly, but the spindle 30 can be manufactured at a low cost and the working precision of the tool W can be held at a high level.

Especially, since the spacer 27 is interposed between the leading end face 23c of the bracket main body 23 and the mounting surface 35b of the flange portion 35a of the intermediate housing 35 opposing to the present leading end face 23c, the swing radius R of the tool W can be adjusted together when fixing the spindle 30 to the bracket 21, and the adjusting operation of the swing radius of the tool is facilitated.

Other structures and operations of the present embodiment are similar to those of the first embodiment.

Third Embodiment

Next, description will be given in detail of a spindle device and a portal machining center serving as a machining center according to a third embodiment of the invention with reference to FIGS. 10 and 11. Here, the parts thereof equivalent to those of the first embodiment are given the same designations and thus the description thereof is omitted or simplified here.

Figure 10:
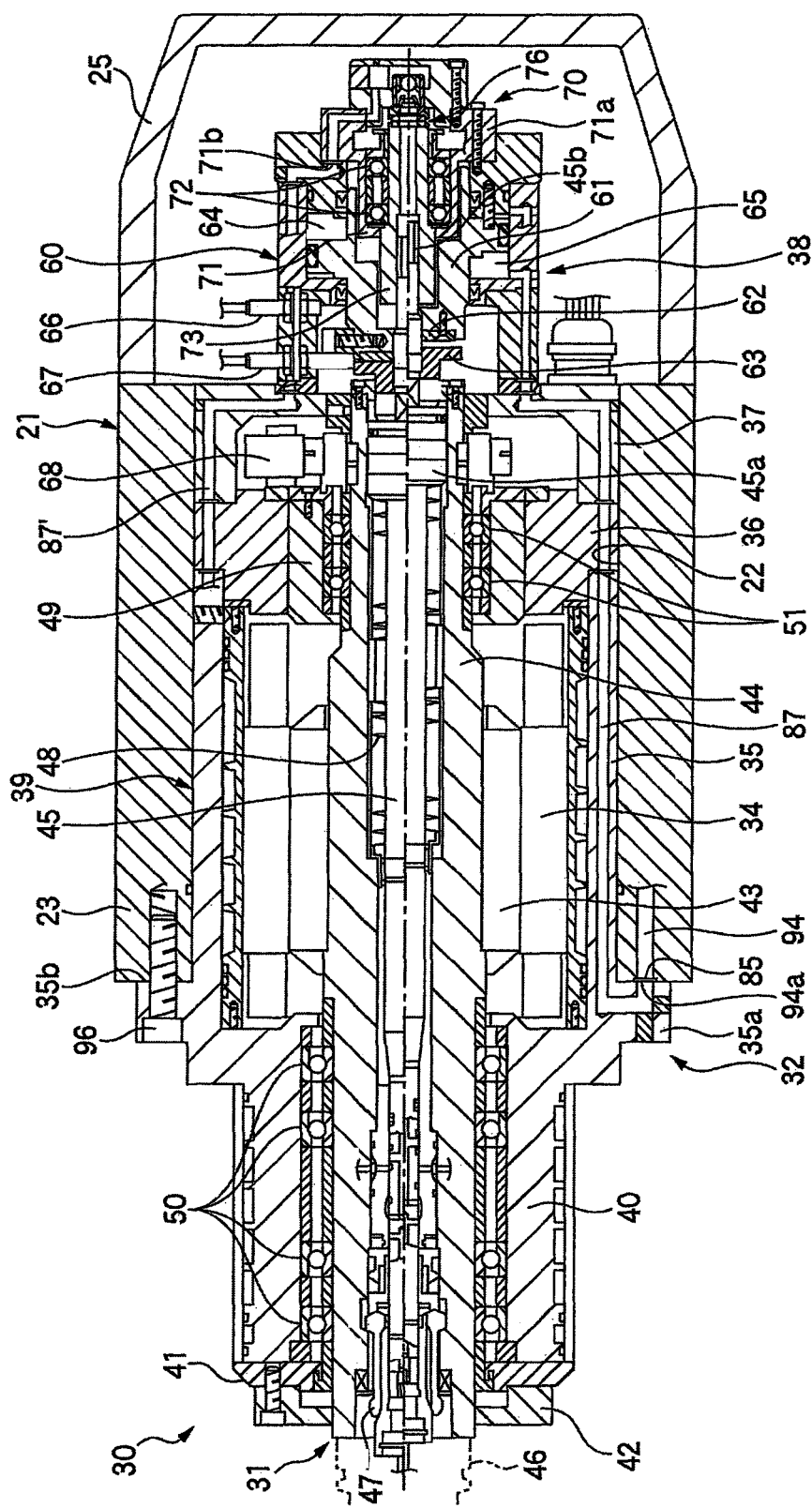
FIG. 10 is a sectional view of a spindle device according to a third embodiment of the invention.
Figure 11:
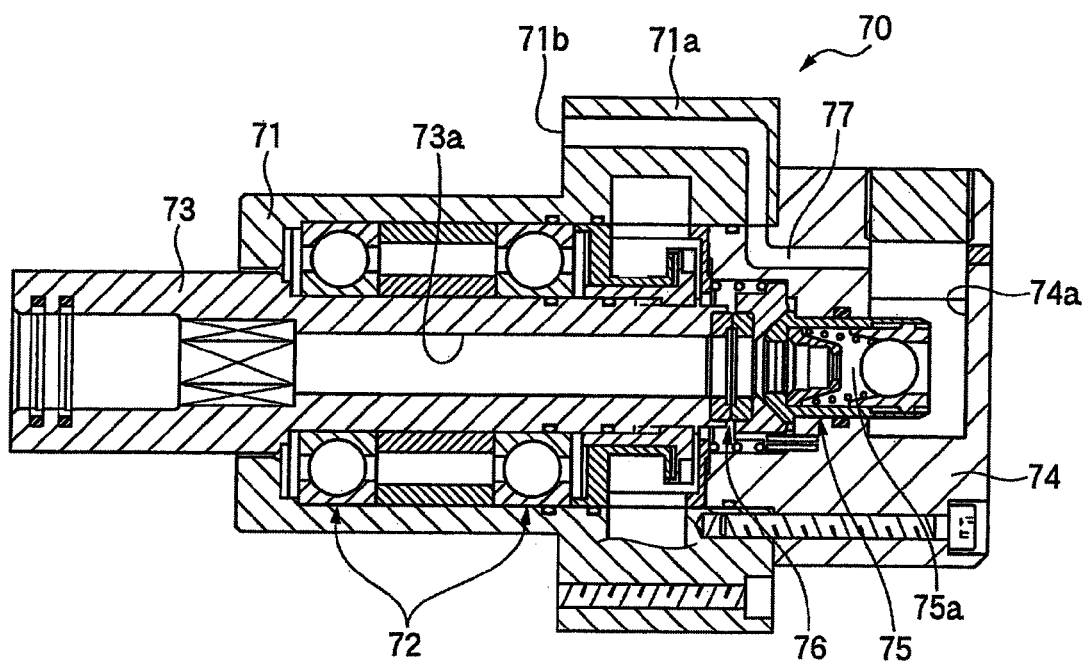
FIG. 11 is an enlarged section view of a rotation joint shown in FIG. 10.

As shown in FIGS. 10 and 11, according to the present embodiment, in the rear portion of the rear cover 38, there is provided a rotation joint 70 which is used to supply a coolant into the draw bar 45 of a rotation portion 31. The rotation joint 70, as shown in FIG. 11, includes a joint case 71 having a flange portion 71a to be mounted so as to oppose to the rear end face of the rear cover 38, a rotation pipe shaft 73 disposed via two bearings 72 so as to be rotatable so as to be rotatable relative to the joint case 71, a floating sheet 75 to be mounted onto a joint cover 74 fixed to the joint case 71 so as to oppose to the rear end of the rotation pipe shaft 73, and a seal portion 76 having seal rings respectively to be mounted onto the rear end portion of the rotation pipe shaft 73 and onto the leading end portion of the floating sheet 75.

The extended portion 45b of the rear portion of the draw bar 45 extended from the rear end of the rotation shaft 44 is attached to the rotation pipe shaft 73 (see FIG. 10) and the rotation pipe shaft 73 rotates together with the rotation shaft 44. Further, a through hole 73a is formed in the interior of the rotation pipe shaft 73, and, the through hole 73a communicates with a hole portion (not shown) formed in the extended portion 45b of the draw bar 45 to thereby constitute a rotation side flow passage.

Furthermore, a through hole 75a, which communicates with a hole portion 74a formed in the joint cover 74, is formed in the interior of the floating sheet 75, and the fixed side flow passage is formed. Then, the through hole 73a of the rotation pipe shaft 73 is made communicate with the through hole 75a of the floating sheet 75 via the seal portion 76, and the rotation side flow passage and the fixed side flow passage are connected together.

An outer tube 39 is fixed to a bracket 21 so that the flange portion 35a of an intermediate housing 35 is fastened to the leading end face of a bracket main body 23 by using bolts. Therefore, the outer tube 39 is structured such that, when bolts 96 are removed, the spindle 30 can be pulled out from the bracket 21 toward the leading end side thereof.

In the present embodiment as well, the clamping pressure oil, unclamping pressure oil, cooling oil and the like, similarly to the first embodiment, are supplied to the spindle 30. However, as shown in FIG. 10, the taper air blow, which passes through flow passages 87' respectively formed in the intermediate housing 35, sleeve housing 36, rear side housing 37 and rear cover 38, is supplied to the respective flow passages 77 of the joint case 71 and joint cover 74 through a flow passage opening 71b formed in the flange portion 71a of the joint case 71 which is mounted onto the rear end face of the rear cover 38. And, in a state where the floating sheet 75 is pressed toward the downstream side due to the supply pressure, the seal portion 76 is closely contacted with the floating sheet 75, whereby the taper air blow can be introduced from the fixed side flow passage to the rotation side flow passage and can be then supplied to the rotation portion 31.

Therefore, according to the spindle device 20 of the present embodiment, since the rotation joint 70 for supplying the fluid to the rotation portion 31 includes the joint case 71, and the flange portion 71a opposes to the rear end face of the rear cover 38 and the flow passage opening for the fluid to be supplied to the rotation joint is formed on the flange portion 71a, the fluid can be supplied to the rotation joint 70 without using any pipings. Thus, the need for provision of a space for the piping within the bracket is eliminated, whereby the spindle device 20 can be produced with a compact structure.

Further, when assembling the rotation joint 70 to the rear cover 38, at the same time, the flow passages for the fluid to be supplied to the rotation joint 70 is connected each other. Thus, when disassembling or assembling the spindle 30 from the bracket 21, it is not necessary to disassemble or assemble the pipings. Therefore, the downtime at the time of maintenance can be shortened and the productivity can be enhanced.

The other structures and operations of the present embodiment are similar to those of the first embodiment.

Fourth Embodiment

Next, description will be given in detail of a spindle device and a portal machining center serving as a machining center according to a fourth embodiment of the invention with reference to FIGS. 12~14. Here, the parts thereof equivalent to those of the first embodiment are given the same designations and thus the description thereof is omitted or simplified.

Figure 13:
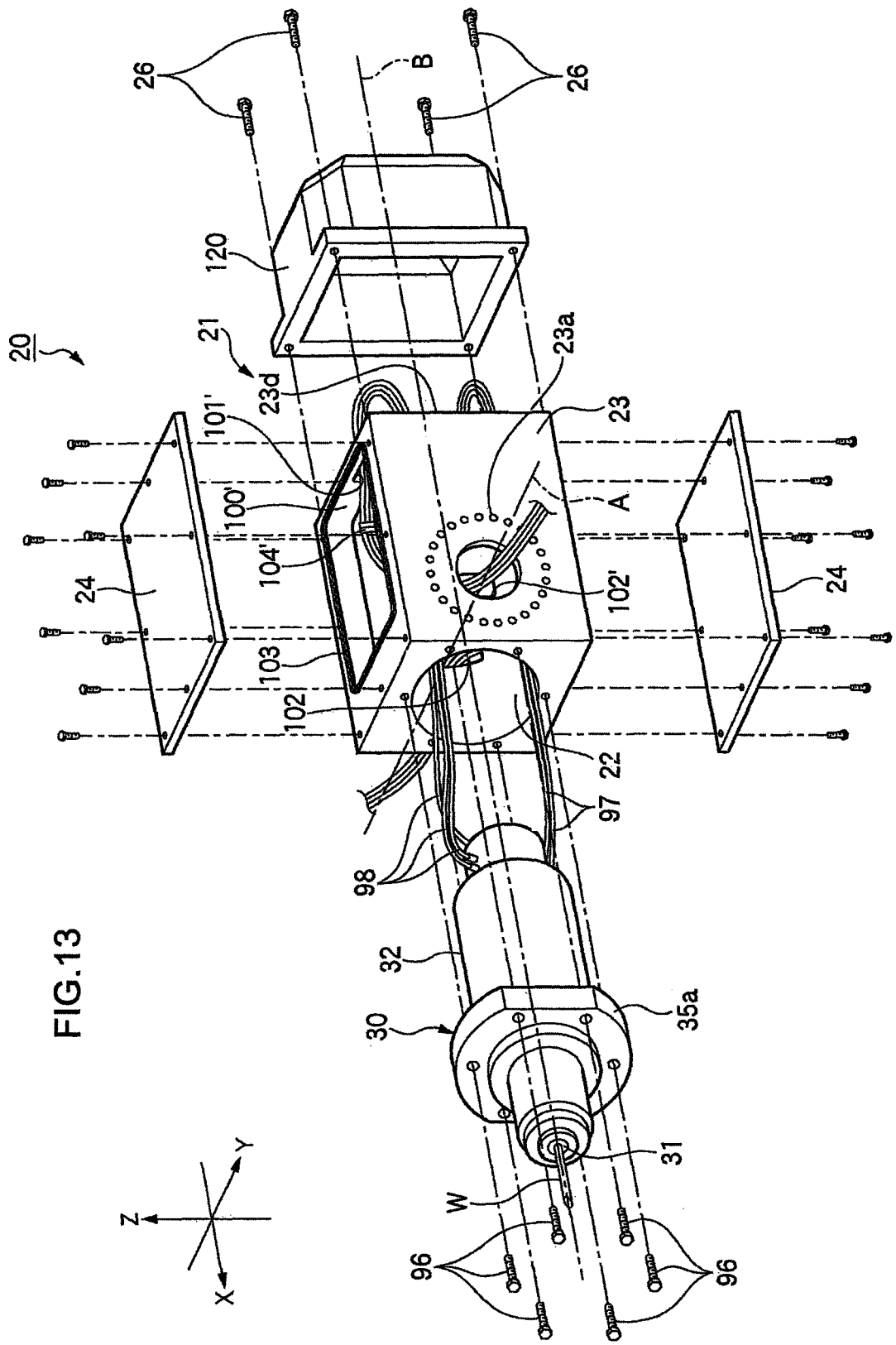
FIG. 13 is an exploded perspective view of a spindle device.
Figure 14:
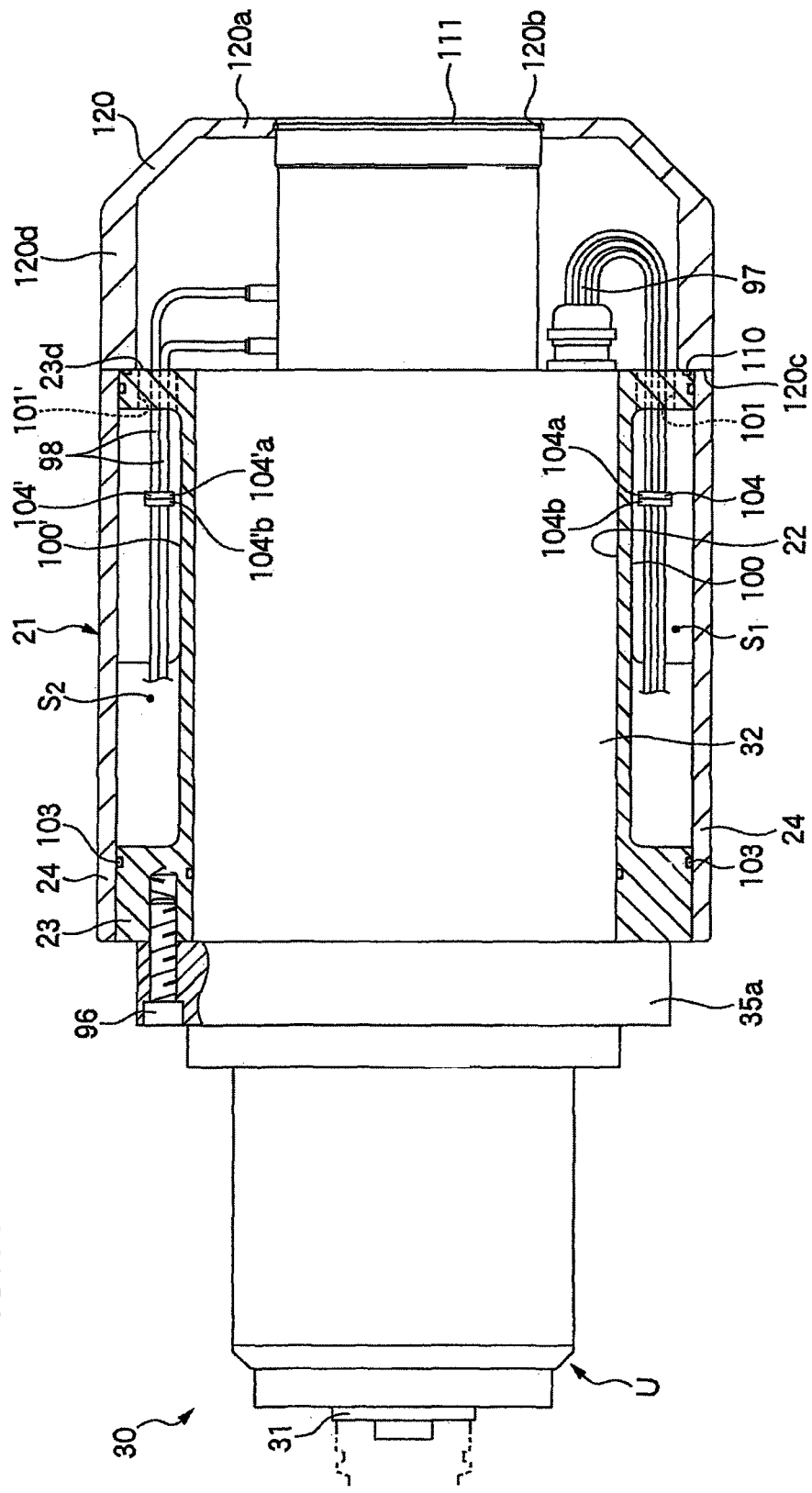
FIG. 14 is a section view of the spindle device.

As shown in FIGS. 13 and 14, according to the present embodiment, as a rear cover, there is provided a tubular cover member 120 which is fixed to the rear end face 23d of a bracket main body 23. The cover member 120 includes a tubular portion 120d; and a bottom portion 120a having a hole at the rear end side. In the cover member 120, an inner peripheral surface 120b of a bottom portion 120a is outwardly fitted with the rear end portion outer peripheral surface of the spindle 30 which is mounted on the bracket main body 23 and projects from the rear end face 23d. Further, a front end face 120c is made oppose to the rear end face 23d of the bracket main body 23, and the cover member 120 is fixed to the bracket main body 23 by bolts 23 at for four corners. Here, in FIG. 14, as the spindle 30, similarly to the above-mentioned embodiments, there can be applied a well-known motor-built-in type of spindle.

The rear end portion of a housing 32, which is other end side of the spindle 30, is formed to have a small diameter. Power lines 97 (wiring) for transmitting power to the stator of a motor and signal lines 98 (wiring) for a sensor provided in the spindle 30 are backwardly extended from the rear end portion of the housing 32 so that they are prevented from interfering with the tubular portion 22 of the bracket main body 23. Here, in the present embodiment as well, as the sensor, there are provided an encoder 68 for detecting the rotation speed of the rotation portion 31, a position detect sensor 66 for detecting the position of a clamping piston, and a tool detect sensor 67 for checking whether a tool is present or not (see FIG. 5).

The power lines 97, which are guided from the housing 32 into the cover member 120, are arranged in a first space S1 which is formed in the bracket main body 23. On the other hand, the respective signal lines 98 within the cover member 120 are arranged in a second space S2 which is formed at the substantially symmetric position of the first space S1 with respect to the center axis B of the tubular portion 22 of the bracket main body 23.

O-rings 110, 111, which are seal members, are respectively disposed between the rear end face 23d of the bracket main body 23 and the front end face 120c of the cover member 120; and between the rear end portion outer peripheral surface of the housing 32 of the spindle 30 and the inner peripheral surface 120b of the bottom portion 120a of the cover member 120. The O-rings 110, 111, cooperate together with the bracket main body 23 and housing 32 to seal the inside of the cover member 120 from outside. Thus, the wirings 97 and 98, which are introduced from the housing 32 of the spindle 30 into the respective spaces S1 and S2 of the bracket main body 23, can be positively sealed by the cover member 120.

The first and second spaces S1 and S2 are formed substantially equal in shape to each other. As shown in FIGS. 13 and 14, groove portions 100 and 100'; open holes 101 and 101'; and inclined holes 102 and 102' are formed in the bracket main body 23. The groove portions 100 and 100' are respectively formed on the two side surfaces which are perpendicular (in the Z axis direction) to the swing axis A of the bracket main body 23 and the center axis B of the tubular portion 22. The open holes 101 and 101' respectively penetrate through the groove portions 100 and 100' from the rear end face of the bracket main body 23. The inclined holes 102 and 102' are respectively opened from the bottom surfaces of the groove portions 100 and 100' to the respective mounting surfaces capable of mounting the swing shafts 10 thereon. The inclined holes 102 and 102' are also partially opened on the inner peripheral surface of the tubular portion 22. Further, in the peripheries of the groove portions 100 and 100', ring grooves 103, on which O-rings (not shown) are mounted, are formed. When a pair of flat plate covers 24 are fixed to the bracket main body 23, the side surface openings of the groove portions 100 and 100' are sealed.

Figure 12:
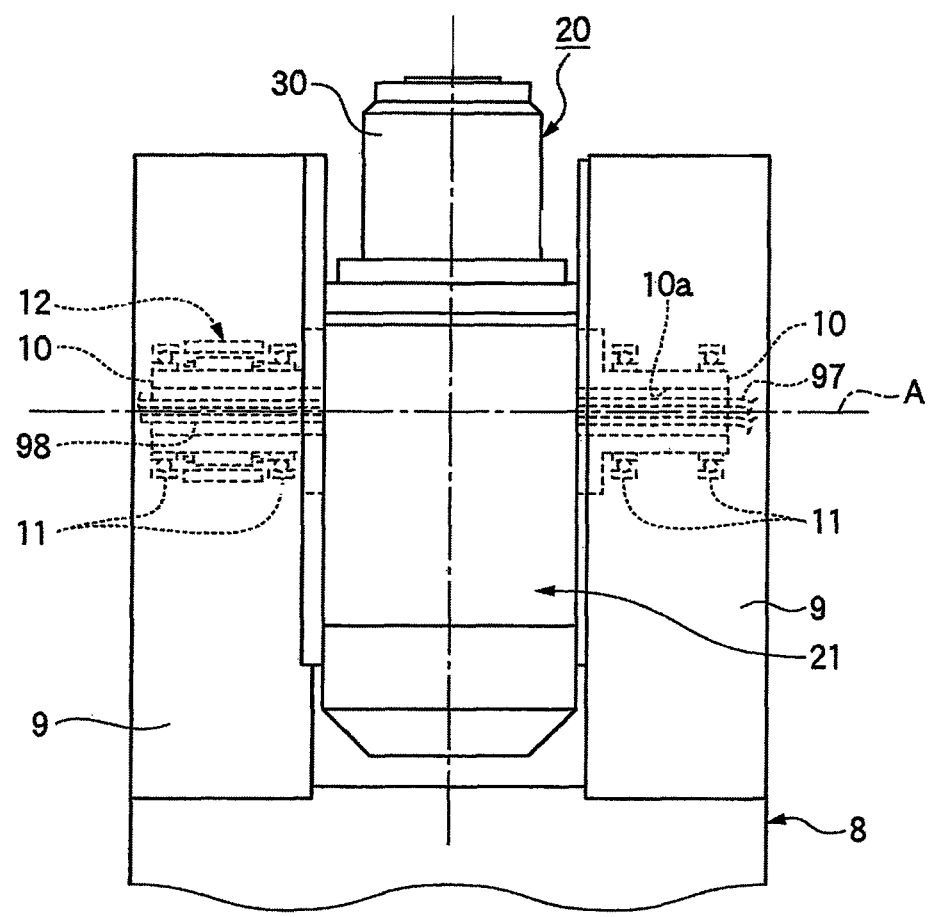
FIG. 12 is a front view of a spindle head according to a fourth embodiment of the invention.

Further, the power lines 97 and signal lines 98 are arranged within the thus formed first and second spaces S1 and S2; are introduced from their respective mounting surfaces; are respectively taken out from their associated cylindrical surfaces 10a respectively formed on a pair of swing shafts 10; and are introduced to the spindle head side (see FIG. 12). As shown in FIG. 13, the power lines 97 and signal lines 98 are respectively connected in the intermediate portions thereof by joint parts 104 and 104' such as crimping terminals or connectors having a pair of connecting parts for removably connecting terminals to each other. The joint parts 104 and 104' are disposed at positions distant a certain distance from such extended portions of the wirings 97 and 98 as extended from the outer surface of the housing 32, while the joint parts 104 and 104' are accommodated into the groove portions 100 respectively. Here, the joint parts 104 and 104' may also be accommodated into the cover member 120. Also, the joint parts 104 and 104' shown in FIG. 14 respectively include male connectors 104a and 104a' respectively disposed on such wiring side as extended from the spindle 30 and female connectors 104b and 104b' respectively disposed on such wiring side as existing on the spindle head side.

According to the thus structured spindle device 20 of the present embodiment, the bracket 21 includes the bracket main body 23 having the tubular portion 22, and the tubular cover member 120 for storing therein the power lines 97 and signal lines 98 which are mounted on and extended from the rear end face 23d of the bracket main body 23 and on the rear end portion outer peripheral surface of the spindle 30. Accordingly, these wirings 97 and 98 are accommodated into the cover member 120 and are arranged on the support arm side without being exposed to the outside, thereby being able to secure the waterproof property of the wirings 97 and 98. Especially, according to the present embodiment, since there are disposed the joint parts 104 and 104' in the intermediate portions of the wirings 97 and 98, the invasion of the fluid such as a coolant from these portions can be prevented more positively. Further, since the cover member 120 is mounted on the rear end face outer peripheral surface of the spindle 30, the cover member 120 can be provided without elongating the whole of the spindle device 20 in the axial direction, whereby the spindle device 20 can be produced with a compact structure.

Further, the O-rings 110, 111 are respectively interposed between the rear end face 23d of the bracket main body 23 and the front end face 120c of the cover member 120; and between the rear end portion outer peripheral surface of the spindle 30 and the inner peripheral surface 120b of the bottom portion 120a of the cover member 120. Thus, the waterproof property of the wirings 97 and 98 can be enhanced.

The other structures and operations of the present embodiment are similar to those of the first embodiment.

Here, the invention is not limited to the above-mentioned respective embodiments, but proper changes, proper improvements and the like are also possible.

According to the above embodiments, the spindle device 20 is swingably supported by the pair of support arms 9 of the spindle head 8. However, the spindle device 20 may also be structured such that it is cantilever supported by a single support arm.

Also, the first and second spaces S1 and S2 formed in the bracket main body 23 according to the fourth embodiment may also be changed into an arbitrary shape, provided that it can attain the object of the invention.

Further, in the fourth embodiment, the inner peripheral surface 120b of the bottom portion 120a of the cover member 120 is outwardly fitted with the rear end portion outer peripheral surface of the housing 32 of the spindle 30. However, the inner surface 120b may be extended from the rear end face 23d of the bracket main body 23 and may be outwardly fitted with the outer peripheral surface at such axial direction position as being capable of accommodating the wirings 97 and 98. That is, the spindle 30 may also be projected backwardly of the cover member 120.

In addition, in the fourth embodiment as well, the fluid such as coolant and cooling oil, which are supplied to and discharged from the spindle, are supplied through the flow passages respectively formed in the bracket main body 23 and the housing 32 of the spindle 30. However, when the fluid are supplied from the bracket main body 23 to the housing 32 of the spindle 30 through pipings, the pipings may be disposed within the cover member 120, thereby being able to secure the waterproof property of the pipings as well.

Here, the present application is based on Japanese patent application (Patent Application No. 2006-351175) filed on Dec. 27, 2006, Japanese patent application (Patent Application No. 2006-351176) filed on Dec. 27, 2006, Japanese patent application (Patent Application No. 2006-351177) filed on Dec. 27, 2006, and Japanese patent application (Patent Application No. 2006-351178) filed on Dec. 27, 2006, and, the contents thereof are incorporated herein for reference.

The invention claimed is:

1. A spindle device comprising:
a bracket swingably mounted on a support arm and comprising a tubular portion substantially perpendicular to a swing axis of the bracket; and
a spindle comprising:
a rotation portion configured to mount a tool on a leading end portion thereof;
a housing mounted on the tubular portion of the bracket and configured to be inserted into and removed from the tubular portion of the bracket, the housing having a mounting surface opposing to a surface of the bracket to which the housing is mounted; and
a bearing interposed between the rotation portion and the housing, and supporting the rotation portion rotatable relative to the housing,
wherein a flow passage opening for fluid to be supplied to the spindle is provided on the mounting surface of the housing.

2. A spindle device comprising:
a bracket swingably mounted on a support arm and comprising a tubular portion substantially perpendicular to a swing axis of the bracket, the tubular portion having a leading end face;
a spindle comprising:
  a rotation portion capable of mounting a tool on a leading end portion thereof;
  a housing mounted on the tubular portion of the bracket so as to be insertable into and removable from the tubular portion of the bracket; and
  a bearing interposed between the rotation portion and the housing, and rotatably supporting the rotation portion relative to the housing; and
  a spacer interposed between the housing and the end face of the tubular portion of the bracket for correcting an error of a swing radius of the tool, said spacer being selected to have a predetermined thickness such that a distance from the leading end face of the tubular portion to the leading end portion of the rotation portion is a predetermined distance.

3. The spindle device as set forth in claim 2, wherein the spacer is interposed between the leading end face of the bracket and a mounting surface of a flange portion which is provided on the housing so as to oppose to the leading end face of the bracket.

4. A spindle device comprising:
a bracket swingably mounted on a support arm and comprising a tubular portion substantially perpendicular to a swing axis of the bracket; and
a spindle comprising:
  a rotation portion capable of mounting a tool on a leading end portion thereof;
  a housing mounted on the tubular portion of the bracket so as to be insertable into and removable from the tubular portion of the bracket;
  a bearing interposed between the rotation portion and the housing, and rotatably supporting the rotation portion relative to the housing; and
  a rotation joint mounted on a rear portion of the housing, and supplying fluid to the rotation portion of the spindle,
wherein the rotation joint comprises a flange portion,
the flange portion opposes to a rear portion end face of the housing and
a flow passage opening for fluid to be supplied to the rotation joint is provided on the flange portion.

5. A spindle device comprising:
a bracket swingably mounted on a support arm and comprising a tubular portion substantially perpendicular to a swing axis of the bracket; and,
a spindle mounted on the tubular portion of the bracket so as to be insertable into and removable from the tubular portion of the bracket, said spindle including a housing and a rotation portion supported by the housing
wherein a tool is adapted to be mounted onto one end side of the spindle, and wire is provided on and extends from the other end side of the spindle, said wire transmitting at least one of power and signals to the spindle device, and
the bracket comprises:
  a bracket main body having the tubular portion; and,
  a tubular cover member mounted on a rear end face of the bracket main body and on an outer peripheral surface of the housing of the spindle and in sealing engagement therewith, the cover member accommodating therein the wire.

6. The spindle device as set forth in claim 5, wherein
seal members are respectively provided between the rear end face of the bracket main body and a front end face of the cover member; and between the outer peripheral surface of the spindle and an inner peripheral surface of the cover member.

7. The spindle device of claim 1, wherein the housing includes a flange on which the mounting surface is provided.

8. The spindle device of claim 7, further comprising means for securing the flange to the surface of the bracket.

9. The spindle device of claim 7 wherein the surface of the bracket also includes a flow passage opening which communicates with the flow passage opening provided on the mounting surface of the housing wherein the housing is mounted to the bracket.

* * * * *